United States [11] 3,835,253

Bond [45] Sept. 10, 1974

X 5060E

TX 5019D X 5066R

155/12

[54] TELEVISION COMMUNICATION SYSTEM WITH TIME DELAY COMPENSATION

[75] Inventor: Donald Spencer Bond, Princeton, N.J.

[73] Assignee: RCA Corporation, New York, N.Y.

[22] Filed: July 10, 1972

[21] Appl. No.: 270,246

[52] U.S. Cl. .............................. 178/69.5 DC, 325/4

[51] Int. Cl. .......................... H04n 5/04, H04n 7/14

[58] Field of Search ............................ 325/4, 58, 63; 178/69.5 TV, 69.5 DC

[56] References Cited

UNITED STATES PATENTS

| | | | |
|---|---|---|---|
| 3,351,858 | 11/1967 | Jowett et al. | 325/4 |
| 3,363,180 | 1/1968 | Geissler | 325/4 |
| 3,435,141 | 3/1969 | Hileman | 178/69.5 DC |
| 3,611,435 | 10/1971 | Cooper | 352/4 |
| 3,646,444 | 2/1972 | Bitzer | 325/58 |
| 3,655,913 | 4/1972 | Schneider | 178/69.5 TV |

*Primary Examiner*—Robert L. Richardson
*Attorney, Agent, or Firm*—Eugene M. Whitacre; Charles I. Brodsky

[57] ABSTRACT

A television station which receives remotely originated signals via relay satellite can time its local sync and burst signal generators with a standard reference frequency which it itself sends to the relay satellite and receives back from the relay satellite. This permits locally originated signals timed by the local sync and burst signal generators to be synchronized with the remotely originated signals to good approximation, despite time delay variations of the remotely originated signals caused by variations of the relay satellite orbit, permitting an adjustable delay line to then be used to compensate remnant delay variations. Consequently, cross fading or other special-effects mixing between locally and remotely originated programs is facilitated.

5 Claims, 5 Drawing Figures

3835253
OR IN 358/149

TELEVISION COMMUNICATION SYSTEM WITH TIME DELAY COMPENSATION

This invention relates to terminal equipment for a synchronized communication system used in conjunction with an earth satellite relay link, and more particularly to apparatus for accommodating transmission delays in received signals which delays are caused by orbital variations of the satellite.

Television programs often originate from two or more cities at one time. It is desirable to be able to combine the pictures on the viewers' screen with proper color subcarrier and raster synchronization. Further, it is desirable that switching between program origination points be accomplished without generating switching transients that will upset proper horizontal and vertical synchronization of a television receiver. At present this is done using oscillators of very high stability at each of the program originating studios and electrically controlling the timing of the synchronizing generators at these locations from the respective oscillators.

To compensate for the very slow relative drift of two such oscillators, orders are given by voice transmission or other means to the operator at the "remote" studio to adjust the phase of his oscillator to agree with the local oscillator signal as monitored at the "master" studio location. For example, the master station for program assembly for network distribution may be in New York City, and the remote program origination point may be in Washington, D.C.

Rubidium frequency standards, which are commercially available, are used at each location. These now have longtime frequency stability better than 20 parts per $10^{12}$ and short time values less than 10 parts per $10^{12}$. By means of a frequency synthesizer controlled by the rubidium standard source, the NTSC color subcarrier frequency $f_c = 3,579,545$ Hz is generated; and this signal is divided down in frequency by appropriate factors to control the horizontal and vertical scan frequencies $f_H$ and $f_V$ of the synchronizing generator in the studio at that location. If the rubidium standard at the remote location has a stability of 10 parts per $10^{12}$ the drift with respect to an ideal standard at the master location is 46.5 degrees per hour at the color subcarrier frequency or a total equivalent time difference of 36 nanoseconds.

Color carrier phase error must be maintained to within about 3°. Despite the high stability of the rubidium standards a number of manual or automatic phase adjustments must be made so that color synchronization can be maintained for a program of one hour duration. When television signals are transmitted over a terrestrial microwave relay circuit of the type widely used in the United States, delay changes are generally gradual and seldom more than 100 nanoseconds in magnitude. If the interconnecting link for the transmission of the television signals from the remote to the master station includes an earth-synchronous satellite relay, however, the changes in transmission path length will produce delay changes considerably greater than those just described. Though the satellite is nominally in a circular orbit and stationary with respect to a point on the surface of the earth, the actual variations in path length cause substantial transmission delay variations. In the typical instance where the satellite maintains station to an accuracy of ±0.1° in orbit longitude, the difference between apogee and perigee distance may be as much as 40 nautical miles because of the slight ellipticity of the orbit. The round-trip transmission delay variation is 535 microseconds. This variation has a period of one sidereal day.

An adjustable electrical delay line to compensate this 535 microsecond transmission delay variation is desired to fulfill the requirements for phase control of the television color subcarrier and of the synchronizing and video signals associated with this subcarrier. Electrical delay rather than merely the phase of the color subcarrier must be changed to compensate for the actual change in the space path length, because the horizontal and vertical synchronizing signals must be held in a fixed time relationship with the color subcarrier frequency. One means suitable for small adjustable delays has been described by C. H. Coleman in the IEEE Transactions on Broadcasting, Volume BC-17, No. 1, page 29 in March, 1971 and entitled "A New Technique for Time-Base Stabilization of Video Recorders." The complexity of the apparatus and the limited range of adjustment make the use of such apparatus in a satellite relay link as the primary means of delay variation compensation unattractive, however.

The present invention is embodied in terminal equipment for a synchronized communication system using both locally generated and remotely generated signals, which remotely generated signals are relayed to the terminal equipment by an earth satellite. Means for synchronizing the locally generated signals include a reference frequency source at the terminal equipment location. Means are provided at the terminal equipment location for transmitting waves related to the reference frequency to the satellite for retransmission to means for receiving retransmitted waves related in frequency to the reference frequency, also at the terminal equipment location. Means are also included to utilize the received retransmitted waves related in frequency to the reference frequency operates to synchronize the locally generated signals.

The present invention will be better understood by referring to the ensuing description of the drawing in which.

Figure 1:
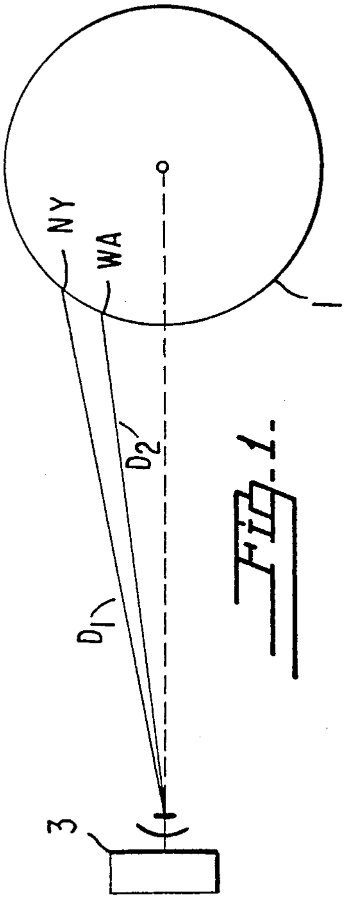
FIG. 1 is a diagram of the transmission paths to a synchronous relay satellite, illustrating the geometry of the earth satellite relay link which facilitates the present invention.

Referring to FIG. 1, the earth 1 is orbited in its equatorial plane (shown in dotted line) by a synchronous equatorial satellite 3. Two earth stations, one labelled as NY for New York and the other as WA for Washington, represent the master station at which television programs are assembled and one remote station from which programs are sent via satellite 3 to NY, respectively. NY and WA are near enough together (400 km) as compared to the distance from either of them to the satellite 3 (35,000 km) that the vectorial component of the satellite's radial motion that lies along line $D_2$ from WA to satellite 3 is substantially equal to the vectorial component of its radial motion along line $D_1$ from NY to 3.

Figure 2:
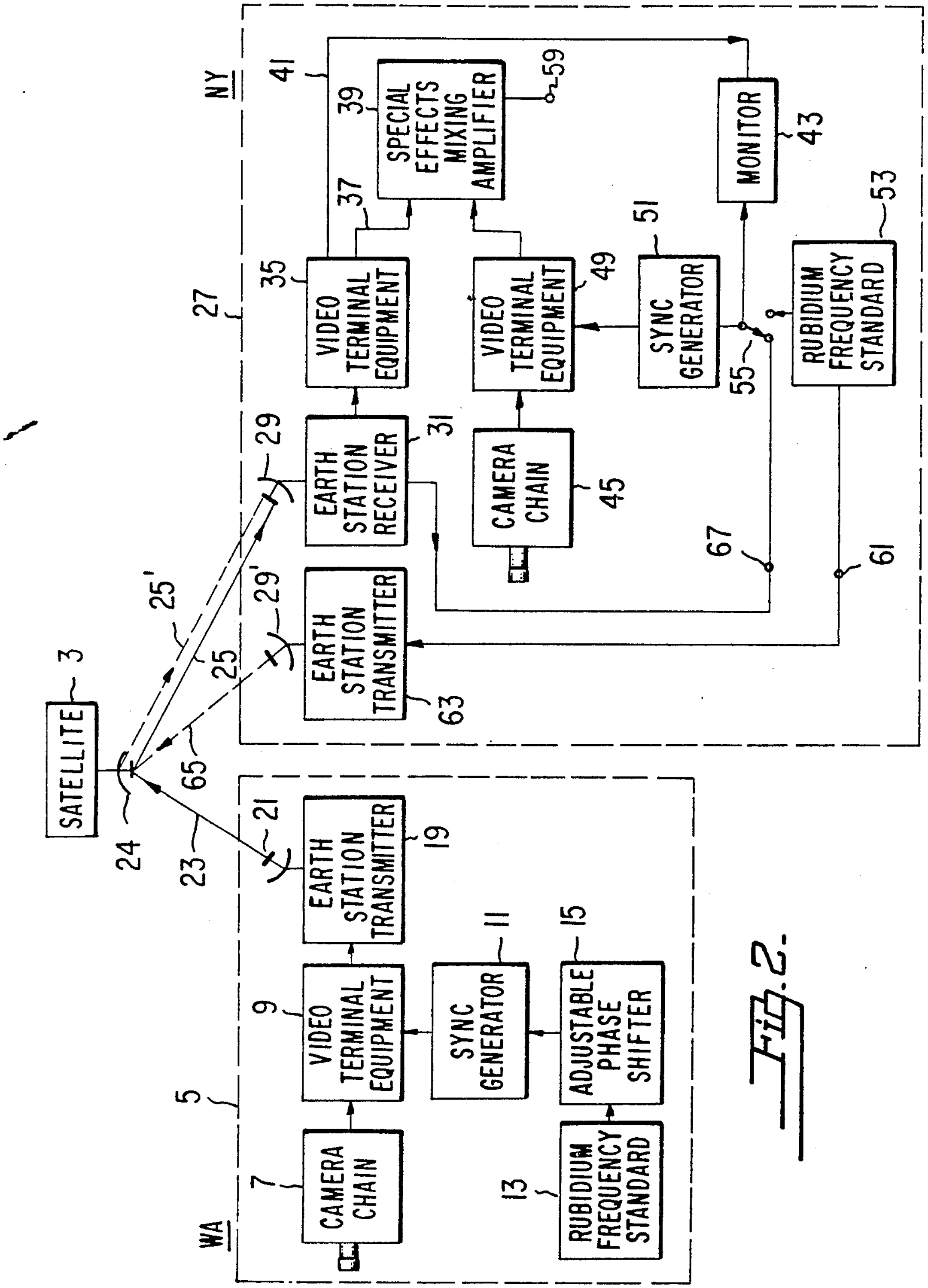
FIG. 2 is a block schematic diagram of the remote station, the master station where a receiver according to the present invention is used, and the satellite relay.

Referring to FIG. 2, transmitting apparatus at station WA is shown in block 5. A camera chain 7 provides video information to video terminal equipment 9. A synchronizing signal (sync) generator 11 provides timing information to the video terminal 9. The sync generator is timed in turn by color subcarrier signal of frequency $f_c$ provided from a rubidium frequency standard oscillator 13 coupled through a continuously adjustable phase-shifter 15. The output of the video terminal equipment 9 provides a composite TV signal comprising picture, sync pulses, and color subcarrier applied to the modulating signal input circuit of an earth station transmitter apparatus 19. In the transmitter apparatus 19 the composite signal is modulated onto a carrier wave, and this carrier wave is coupled from the output circuit of the transmitter apparatus 19 to the antenna 21 and radiated via space path 23 to the antenna 24 and transponder (not shown) of satellite 3.

Signals so received are retransmitted on a different carrier frequency via space path 25 toward the NY station shown in block 27. The signals intercepted by antenna 29 are supplied to an earth station receiver 31, which has at least two reception channels. The composite TV signal previously described is recovered by the earth station receiver 31 from the retransmitted signal and is supplied from the output circuit of receiver 31 to the input circuit of studio video terminal equipment 35. There, certain portions of the signal are blanked out prior to the signal being applied to a special effects mixing amplifier 39. A second output circuit of video terminal equipment 35 provides regenerated color subcarrier, derived from the received color burst of the standard NTSC signal sent from station WA, to the input terminals of a color subcarrier phase monitor (or vectorscope) 43.

A camera chain 45 is connected to video terminal equipment 49 controlled by sync generator 51. The camera chain 45, video terminal equipment 49 and sync generator 51 perform similarly to their counterparts 7, 9, 11 at station WA in block 5. Sync generator 51 may be fed directly from rubidium frequency standard oscillator 53 if switch 55 is switched from the position shown to its alternative position. Output video signals from video terminal equipment 49 are applied to the mixing amplifier 39. In the mixing amplifier 39 the composite signal provided by terminal equipment 49 is replaced during certain portions of the raster with portions of the signal originating at WA to provide a signal at terminal 59 to be used for network distribution, broadcasting or for video tape recording. Mixing amplifier 39 can also sequentially select between signals originating at cameras 7 and 45.

Except for the earth station transmitters 19, 63; the earth station receiver 31 and the satellite, the components of stations 5 and 27 hereintofore described are currently used in network television for the mixing or switching of programs from two or more camera chains.

The color subcarrier signal from rubidium standard 53 supplied at its output terminal 61 is applied to the input circuit of the earth station transmitter 63 and modulated upon a carrier wave supplied to antenna 29', which may be common with 29. These carrier wave signals are transmitted by space path 65 to satellite 3 and returned by path 25' to antenna 29 and to receiver 31. A separate reception channel in the receiver 31 recovers delayed color subcarrier signal from the carrier wave signals and supplies them selectively from its output terminal 67 via switch 55 to sync generator 51. This arrangement provides a loop circuit through satellite 3 wherein the color subcarrier signal from 53 is delayed by the space path before being used to synchronize the video camera chain at NY and consequently appears shifted in phase relative to the original signal from the frequency standard 53.

During its round trip the color subcarrier signal traverses a first combined path length (65 plus 25') twice as long as the path length from NY to the satellite. The composite signal bearing the color subcarrier from WA traverses a second combined path length (23 plus 25). This second combined path length comprises a first path length substantially equal to the NY to satellite path length (the WA to satellite path length) plus the path length from the satellite to NY. Consequently, any changes in altitude of the synchronous satellite affect both the first and second combined path lengths substantially the same. So, there will be very small residual phase shift or relative time delay between the color subcarrier signals gathered at the antenna 29, whether they are provided from the rubidium frequency standard 13 in WA or the one 53 in NY. The residual time delay difference $\Delta t_o$ between these signals is small enough to be conveniently compensated by a so-called "mop-up" adjustable delay line similar to the ones now employed in television studios both for live transmissions and recorded programs.

Figure 3:
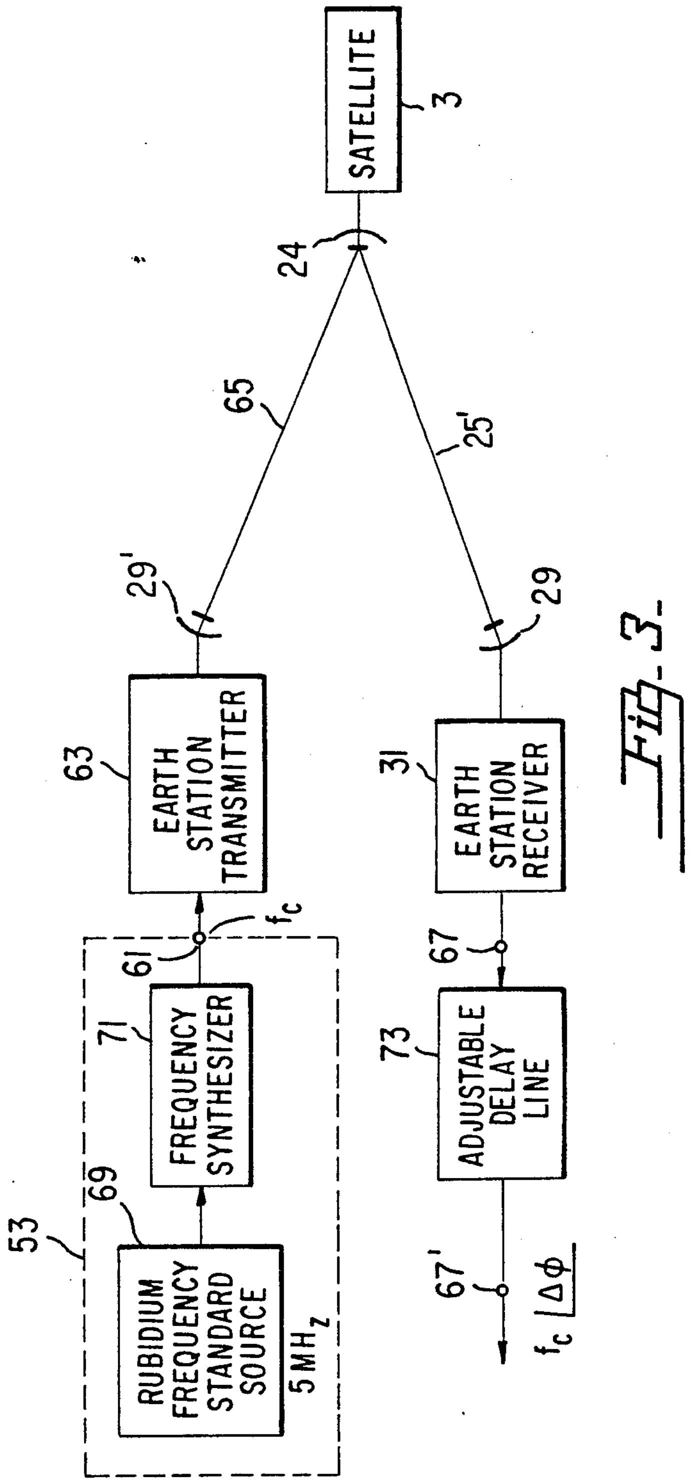
FIG. 3 is a block schematic diagram showing in more detail the subcarrier loop linking the master station and the satellite.

Details of the color subcarrier loop from NY to the satellite may be described by reference to FIG. 3. Parts previously described with reference to FIG. 2 bear the same reference numbers. A rubidium frequency standard source 69 of the type sold commercially by Hewlett-Packard as its Model 5065A delivers a very stable output frequency of 5 MHz. The output signal feeds into frequency synthesizer 71, typified by the Hewlett-Packard Model 5103A and produces a 3.579545 MHz output signal $f_c$ at terminal 61 to conform to NTSC standards used in the United States. The signal path from terminal 61 to terminal 67 has already been discussed with reference to FIG. 2.

An adjustable delay line 73 to compensate any remnant time delay errors is optional and may be inserted in either the receiver circuit at 67 as shown or the sending circuit at 61. Output signal at terminal 67' consists of a signal wave with frequency $f_c$ and a Doppler frequency shift. This Doppler frequency shift can be expressed in terms of the time-dependent phase shift $\Delta\phi$ measured from an initial phase condition at the beginning of a period during which program synchronization is to be maintained. The signal at the terminal 67' is used to time the sync generator 51 shown in FIG. 2.

While the apparatus described above will ordinarily suffice for the synchronization of two stations, a modification can be included to improve the phase match between widely spaced stations, where the lengths of the paths $D_1$ and $D_2$ differ markedly. For two stations located as far apart as possible in the United States, the length of the path from one earth station to a synchronous equatorial satellite 23 has been calculated to change by as much as 1.6 percent more than the length of the path from the other to the satellite 25. The correction required to compensate for the geometry of earth station locations is small compared to the main radial motion of the satellite. Nevertheless, it may amount to 10 microseconds and this is an undesirably large remnant delay to be compensated by an adjustable delay line.

The lengths of transmission paths through space may be measured in wavelengths of a particular frequency modulated on a carrier wave. As the modulating frequency is increased the length of the path will be lengthened as measured by wavelengths of the modulating frequency. As the modulating frequency is decreased the length of the path will be shortened as measured by wavelengths of the modulating frequency. The modulating frequency at which frequency standard information is transmitted by the local earth station transmitter 63 and retransmitted by relay satellite 3 to the local earth station receiver 31 may be adjusted by heterodyning techniques. The percentage change in the length ($D_1 + D_1$) of the paths 65 and 25' due to radial motion of the satellite 3 as measured in wavelengths of the adjusted modulating frequency can then be made to be the same as the percentage change in the length ($D_1 + D_2$) of paths 23 and 25 as measured in wavelengths of color subcarrier frequency modulating the carrier wave of the remote earth station transmitter 19. This will improve the compensation of transmission delay variations between the local and remote stations 5, 27.

Figure 4:
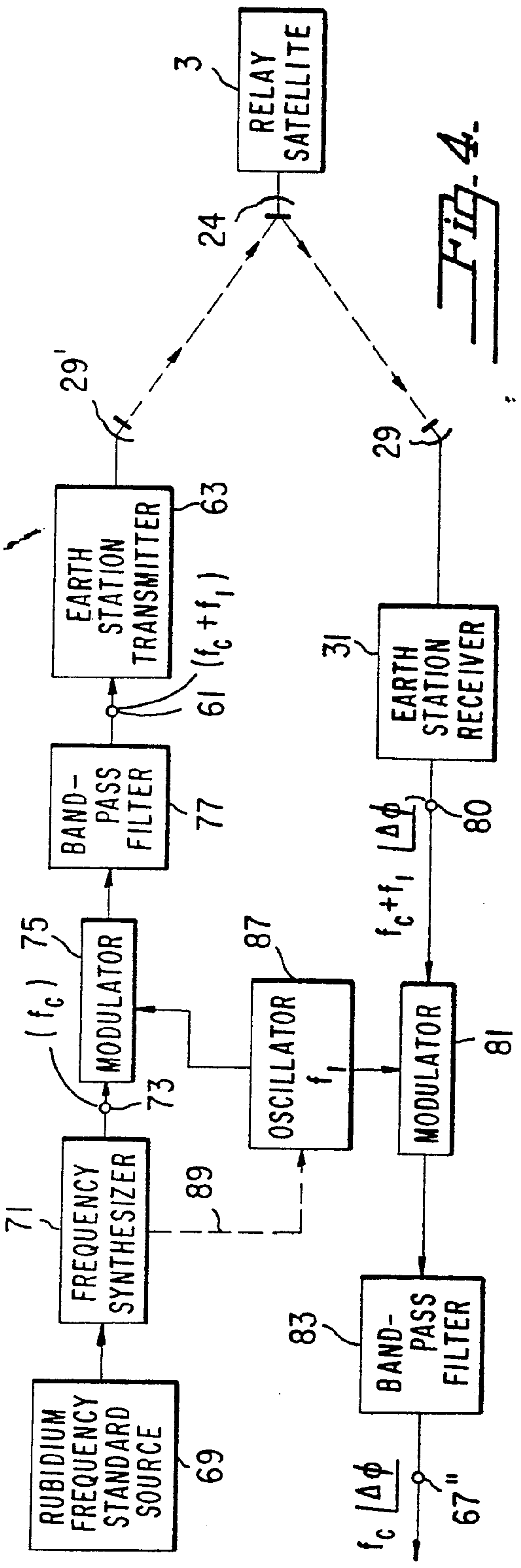
FIG. 4 is a block schematic diagram of apparatus which may be employed at the master station to compensate for differences in path lengths, between it and the satellite and between the transmitting station and the satellite.

FIG. 4 shows appropriate means for doing this. The color subcarrier output of frequency $f_c$ appearing at the output circuit of the frequency synthesizer 71 is applied to a modulator 75 and therein is modulated by a modulating frequency signal $f_1$ supplied from an oscillator 87. (The oscillator 87 optionally may be locked in frequency and phase with the color subcarrier via connection 89 from the frequency synthesizer 71.) The frequency spectrum of the output signals of the modulator 75 may be considered as comprising two subspectra: those signals higher in frequency than the color subcarrier and those lower. A band-pass filter 77 selects the signal component in one of these subspectra (as shown, $f_c + f_1$, the higher-frequency subspectra component) for application to the input terminal 61 of the transmitter 63 as its modulating signal. The modulator 75, typically a balanced modulator for suppression of the color subcarrrier $f_c$, and the filter 77 constitute a single-sideband modulator.

The return signal provided by receiver apparatus 31 at terminal 80 is at $f_c + f_1$ with the relative phase shift $\Delta\phi'$. It is heterodyned with modulation frequency signal $f_1$ in modulator 81. An unwanted subspectrum of the components of the output signal from modulator 81 lying above frequency $f_c + f_1$ is suppressed by fiter 83.

The output signal at terminal 67' is thus of frequency $f_c$ shifted in phase by the space path delay as in the first system described with reference to FIG. 3. An important difference exists, however. Because the space transmission is at frequency $f_c + f_1$, the path length changes caused by the satellite 3 are over a greater number of wavelengths than would be the case at $f_c$. Thus:

$$\Delta\phi' = (f_c + f_1/f_c)\Delta\phi = (1 + f_1/f_c)\Delta\phi$$

The phase shift of color subcarrier frequency $f_c$ appears to have been caused by a space path variation larger by a factor $(1 + f_1/f_c)$. To achieve an improved compensation of transmission delay variations $f_1/f_c$ is made equal to the percentage larger variation of the shorter physical path length $D_1 + D_2$ than the longer physical path length $D_1 + D_1$ as caused by radial motion of the satellite 3.

The lower sideband of modulator 75 would be chosen as a modulating signal for the transmitter 63 if the path length between local station and satellite is shorter than that between the remote station and the satellite. For each different remote station, an appropriate value of $f_1$ can be chosen by calculation from the geometry of station locations. The modulators 75, 81 may be synchronous switches, analog multipliers or mixers of other types.

Figure 5:
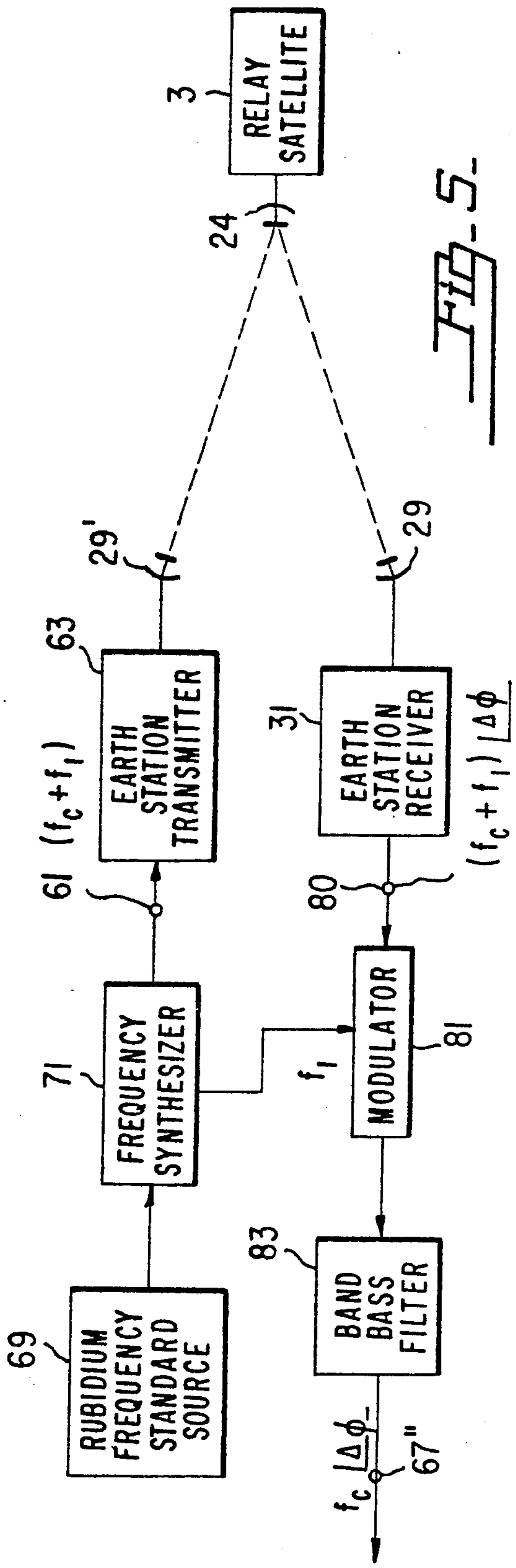
FIG. 5 is a block schematic diagram of an alternative means to compensate for such differences in path length.

An alternative configuration to that of FIG. 4 is shown in block diagram form in FIG. 5. Two output signals are obtained simultaneously from synthesizer 71. The first of these is at frequency $f_c + f_1$ (or $f_c - f_1$) and the other at $f_1$. The latter signal is applied to modulator 81. The phase shifted received signal at frequency $f_c + f_1$ (or $f_c - f_1$) is heterodyned by modulator 81, and the resultant signal band-pass filter by filter 83 as in the apparatus shown in FIG. 4. Recovered standard frequency reference wave of frequency $f_c$ appears at terminal 67' with the appropriate phase shift, as previously described.

The present invention is applicable to transmissions on modulated light carriers as well as on modulated radio-frequency carriers.

What is claimed is:

1. In a television station equipped to receive remotely originated programs via relay satellite and to selectively combine said programs with locally originated programs for network distribution, broadcasting, video tape recording and the like, said television station having first receiver apparatus to receive signals descriptive of remotely originated programs as retransmitted by said relay satellite after its reception of said remotely originated programs from a transmitter at the remote location, a source of standard frequency signal waves, a synchronizing signals generator capable of being locked to a signal wave, a camera chain providing signals being descriptive of locally originated programs and being timed in accordance with said synchronizing signals generator, and apparatus for alternatively selecting portions of said signals descriptive of remotely and locally originated programs as station output signals, apparatus to accommodate delay variations in said remotely originated programs caused by orbital variations of said relay satellite comprising:

auxiliary transmitter apparatus to encode an applied signal upon a carrier wave for transmission to said relay satellite, means to provide a signal responsive to said standard frequency signal waves from said source to supply it to said transmitter apparatus to be encoded upon said carrier wave, auxiliary receiver apparatus to receive retransmitted signals from said relay satellite and to decode them from said carrier wave to recover said encoded signal, means to provide recovered standard frequency signal waves from said recovered encoded signal, and switching means to supply said recovered standard frequency signal waves to said synchronizing signals generator to provide locking therefrom when combining portions of said remotely and locally originated programs as said station output signals and to couple said standard frequency signal waves from its said source to said synchronizing signals generator to provide locking when only said locally originated programs are provided as said station output signals.

2. Delay variations accommodating apparatus as claimed in claim 1 wherein, first frequency translating means is included in said means to supply signal to said transmitter apparatus to be encoded and, second frequency translating means is included in said means to supply recovered standard frequency waves to said synchronizing signals generator.

3. Delay variations accommodating apparatus as claimed in claim 2 wherein said first and second frequency translating means include:

means to provide a modulating frequency wave;

first modulator means, to modulate said standard frequency signal waves by said modulating frequency to provide first sideband signals located in frequency subspectra respectively of lower frequency than said standard frequency and of higher frequency than said standard frequency;

first filter means to select said first sideband signals in one of said subspectra provided from said first modulator means and to supply said selected sideband signals to said auxiliary transmitter apparatus for encoding;

second modulator means to modulate said recovered encoded signal by said modulating frequency to provide second sideband signals located in frequency subspectra respectively of lower frequency than said recovered encoded signal and of higher frequency than said recovered encoded signal; and second filter means, to select said second sideband signals in one of said subspectra provided from said second modulator means and thereby to provide said recovered standard frequency signal waves.

4. Delay variations accommodating apparatus as claimed in claim 1 wherein, frequency synthesizing apparatus is included in said means to supply signal to said transmitter apparatus to be encoded, supplying said signal to be encoded from a first of its output circuits and supplying from a second of its output circuits a signal having a frequency equal to the difference in frequency between said standard frequency and the frequency of said signal to be encoded, a modulator means modulates said recovered encoded signal by said signal supplied from said second frequency synthesizing apparatus output, a filter means suppresses frequency components other than said recovered standard frequency signal wave in signals provided from said modulator means to lock said synchronizing signals generator.

5. In a television station equipped to provide selected combinations of locally originated programs and remotely originated programs received thereat by earth orbiting relay satellite for network distribution, broadcasting, video tape recording and the like, and wherein each of said programs are individually timed by reference frequency signal waves of substantially comparable frequency, apparatus at the local location comprising:

a source of said reference frequency signal waves;

a synchronizing signal generator;

a camera chain providing video signals representative of said locally originated programs, controllably timed in accordance with said synchronizing generator;

means for receiving video signals representative of said remotely originated programs as relayed from said orbiting satellite and for providing said signals as an output thereof;

adjustable mixing means having a first input terminal coupled to said camera chain to receive said locally generated video signals, a second input terminal coupled to said last-mentioned means to receive said remotely generated video signals, and an output terminal at which said selected combinations of programs are supplied;

means coupled to said frequency signal source for transmitting said reference frequency wave to said relay satellite and for receiving a corresponding reply therefrom delayed in time as a function of the transmission path length between said satellite and said local location; and means for switching said synchronizing signal generator to lock to said source of reference frequency signal waves when said mixing means is activated to supply programs of local origination only, and for switching said synchronizing signal generator to lock to said reply reference frequency signal wave when said switching means is activated to supply programs of local and remote origination in combination;

whereby in said latter switching condition, the video signals from the camera chain at said local location remain in substantial time synchronism with the video signals from said remote location as relayed by said satellite independent of the transmitting path length between two locations and of any changes therein.

* * * * *